(12) United States Patent
Hayes-Jacobson

(10) Patent No.: US 6,852,347 B2
(45) Date of Patent: Feb. 8, 2005

(54) PARTIALLY THERMAL TREATED DOUGH INTERMEDIATE AND METHOD OF MAKING

(75) Inventor: Susan M. Hayes-Jacobson, Minneapolis, MN (US)

(73) Assignee: The Pillsbury Company, Minneapolis, MN (US)

(*) Notice: Subject to any disclaimer, the term of this patent is extended or adjusted under 35 U.S.C. 154(b) by 49 days.

(21) Appl. No.: 10/099,579

(22) Filed: Mar. 15, 2002

(65) Prior Publication Data
US 2003/0175386 A1 Sep. 18, 2003

(51) Int. Cl.$^7$ ............................................. A21D 10/00
(52) U.S. Cl. ..................... 426/94; 426/275; 426/496; 426/520
(58) Field of Search .................. 426/94, 275, 289, 426/496, 520, 523

(56) References Cited

U.S. PATENT DOCUMENTS

| | | | | |
|---|---|---|---|---|
| 4,986,992 A | * | 1/1991 | Glaros et al. | 426/19 |
| 5,348,751 A | * | 9/1994 | Packer et al. | 426/94 |
| 5,576,036 A | | 11/1996 | Pescheck et al. | |
| 5,780,084 A | * | 7/1998 | Degli Angeli et al. | 426/242 |
| 6,267,998 B1 | * | 7/2001 | Bauman et al. | 426/94 |
| 6,468,569 B1 | * | 10/2002 | Dunker et al. | 426/94 |

FOREIGN PATENT DOCUMENTS

| WO | WO 01/32023 A1 | 5/2001 |
|---|---|---|
| WO | WO 01/32024 A1 | 5/2001 |

* cited by examiner

Primary Examiner—Lien Tran
(74) Attorney, Agent, or Firm—Arlene L. Hornilla; Douglas J. Taylor

(57) ABSTRACT

A method of preparing a partially thermal treated dough intermediate which has reduced tendency to adhere to the processing apparatus is disclosed. The dough intermediate is thermal treated to create a temporary impermeable barrier on each of the layers of the intermediate.

2 Claims, 5 Drawing Sheets

PARTIALLY THERMAL TREATED DOUGH INTERMEDIATE AND METHOD OF MAKING

CROSS-REFERENCES TO RELATED APPLICATIONS

None.

BACKGROUND OF THE INVENTION

The present invention relates to a dough intermediate that is partially thermal treated and which undergoes a further processing step by the consumer before the dough intermediate is ready for consumption. This invention also describes the method of making the intermediate product.

There are a significant number of dough products currently available in today's marketplace, many of which have been targeted directly for consumers seeking convenience. As the demands of consumers for "on the go" type products continue to increase, so do the number of products that can go directly from the freezer to the oven or freezer to the microwave. Retailers not only want to deliver these convenient products but also want the product to resemble and taste like products one may purchase at a local store or make at home. However, the manufacturing, preparing and packaging of such products can be difficult and expensive.

Traditional methods of baking and corner bakeries have produced dough-based products, such as rolls, biscuits, buns, cinnamon rolls or buns, croissants, pastries, etc. through conventional methods: Mixing the dough, adding any filling, coating or icing and then placing the dough product on a large sheet or pan and baking the dough in an oven to produce the final product which is then put in the display case for purchase. Often, the pan used in the baking process is the pan that is then inserted into the display case to display and dispense the product.

Many commercial manufacturers try to replicate this process in order to create a retail package or product, which would have similar characteristics to those products that one may purchase in a corner bakery or may have baked at home.

The dough intermediates are made and shaped by various conventional processes and then placed on trays, pallets, plates, pans, skids and other devices, collectively referred to herein as "appliances", created for the convenience of the manufacturer so that they may be transported through the processing operation. The processing operation may include baking, cutting, sorting, packing, icing, filling and various other processing steps in order to produce the anticipated end product.

Once the dough is deposited onto these appliances, the dough can stick to the surface, and if fillings or coatings are provided, the fillings or coatings can also contaminate the surface of the appliance if the fillings or coatings touch the surface of the appliance. This situation is only further exacerbated during cooking or heat-treating of the dough, as pieces of the dough can become more permanently affixed to the surface of the appliance creating hard to remove food pieces. Moreover, in automated processing lines there is some difficulty in aligning the products with the appliances such that spillage or overage occurs when loading the appliances. That is, if the appliance has a raised edge, the products may land on the edge and be half in and half out of the appliance. This causes the line to slow down while the dispensing is adjusted and the line cleaned up.

Thus, while the use of such appliances to move dough products through a processing line has facilitated the growth and speed of commercial processing lines, such operations require that the appliance needs to be cleaned and readied for the next batch of products causing delay in turnaround as well as the cost associated with the cleaning the appliance or, alternatively, the appliance may be simply discarded creating waste and adding cost to the production of the products.

The rise in the use of such appliances has also created the need for supplementary processing apparatus to remove the products from the appliance. These devices are fairly capital intensive and would be unnecessary if other ways are found to process dough products.

The use of such appliances has grown over time and has heretofore been viewed as a necessity for the commercial production of dough products. The appliance provides protection for the processing line, by preventing direct contact between the dough product and the line itself.

Dough-based products and dough intermediates, when exposed directly to the surface of the processing apparatus, will stick to the surface of the apparatus, such as a conveyor belt. Repeated trips of the apparatus or conveyor belt, particularly where there is an oven in the line or other cooking apparatus involved, will cause the drippings or stuck pieces to char or burn creating smoke in the work place and potentially shutting down the line while it is cleaned if the amount of smoke is excessive. In addition, the burning of excess material may also add unwanted, unanticipated and undesirable flavors and textures in the dough product or dough intermediate.

In addition, with repeated trips of dough down the conveying line, as mentioned before, deposits can build up which may create unsanitary situations, interference with the mechanicals of the line, e.g. clogging of belts and gears, and other undesirable situations.

Another problem attributable to the use of appliances can also create or develop an unpleasant taste in the dough product, if the dough product or dough intermediate is required to remain in contact with the appliance for prolonged periods of time. For example, if the appliance is metal, the intermediate may acquire a metallic taste.

If the appliance is made of paper or other fiber-based material, fibers may cling to the sticky dough surface. Furthermore, if the appliance has slots or gaps in the surface, these surface deformities can be transferred directly to the dough product or dough intermediate creating undesirable shapes, which may result in the dough being discarded.

In addition, if the product is baked on an appliance, the product can have a "gummy" texture as the level of airflow is reduced between the bottom of the dough product and the appliance. That is moisture level between the two surfaces remains at an elevated level when compared with the rest of the dough product. This situation can cause difficulty in removing the product from the surface of the appliance.

Another problem that is encountered with the processing of dough products and dough intermediates is the use of a proofing step. Proofing subjects the dough product to an elevated temperature and humidity, which gives the dough a chance to rise. This proofing step may continue for up to an hour in duration. While proofing is a necessary step in the processing of dough, it softens the texture of the dough product and if exposed to the processing apparatus, increases the likelihood that the dough product will cling or stick to the surface of the apparatus.

One solution that has been tried in the past has been to coat the processing apparatus with release materials so that the dough products or dough intermediates will not stick to the surface of the apparatus. However, this solution also suffers from various drawbacks. The release coating needs to periodically be replaced, otherwise the dough product or dough intermediate will stick to the uncoated areas, causing the processing line to suffer from the defects enumerated above. Where the coating is degradable, such as a sprayed-on oil-based release, the release coating needs to be applied at regular intervals. This can cause excessive deposits in areas of the processing apparatus which ultimately requires cleaning, the incursion of undesirable flavors in the food and possibly unanticipated color changes as the release coating interacts with the surface of the dough product or dough intermediate.

Many of the problems associated with handling dough products have dealt with making additions to the processing line; however, surprisingly it appears that the most cost effective means of handling such sticky dough intermediates may have been overlooked.

What is needed is a dough product or dough intermediate that has the appearance of baked goods or pastries found in a corner store, but which can be processed by commercial manufacturers without any of the foregoing drawbacks. In addition, it is an object of the present invention to provide a manufacturing process to facilitate production of the dough intermediate.

BRIEF SUMMARY OF THE INVENTION

It is the primary object of this invention to provide a dough product or dough intermediate that can be processed using commercial manufacturing equipment without suffering from the drawbacks enumerated above.

In one preferred embodiment of the present invention a partial thermal treated dough intermediate, comprises an intermediate having at least first and second layers. The first layer is composed of a moldable dough formed from flour, water and yeast. The first layer has first and second surfaces and each of the first and second surfaces have equivalent first and second areas. The first layer further having first and second end edges. The second layer is coated on at least one of the first and second surfaces of the first layer. The second layer is coated in the area of the one of the first and second surfaces such that the layer is at least approximately adjacent one of the first and second end edges of the first layer. At least one of the first and second end edges of the first layer with the second layer being coated adjacent thereof is partially thermal treated to create a temporary impermeable barrier across each of the first and second layers on the one of the first and second end edges with the second layer coated adjacent thereof.

In a further preferred embodiment of the present invention partial thermal treated dough intermediate, comprising an intermediate having at least first and second layers. The first layer has a first thermal property and the second layer of the intermediate has a second thermal property different than the thermal property of the first layer. The first and second layers after being partially thermal treated form a temporary impermeable barrier across each of the first and second layers having differing thicknesses.

In a still further embodiment of the present invention, a method of preparing a partial thermal treated dough intermediate, comprises the steps of: Providing an intermediate having first and second layers, the first layer having first and second surfaces and first and second end edges. Advancing the intermediate in a first direction. Applying a partial thermal treatment to one of the first and second end edges. Creating a temporary impermeable barrier having a different thickness across the first and second layers so as to prevent the one end edge of the intermediate from sticking to an exposed processing surface.

This and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
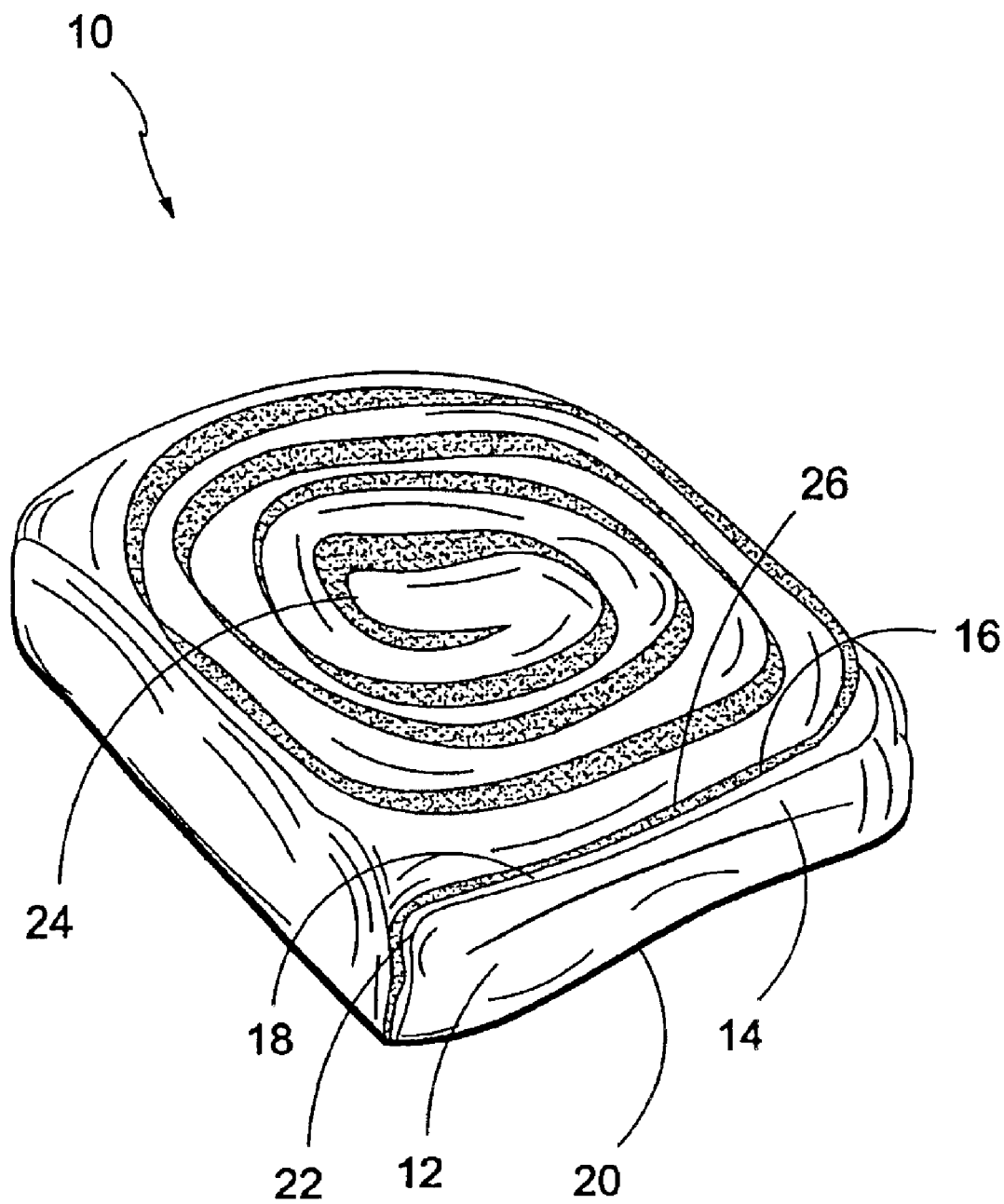
FIG. 1 is a front plan view of an exemplary intermediate for a dough intermediated, according to the invention.

FIG. 1 illustrates a front plan view of the dough intermediate 10 of the present invention. The intermediate 10 has a first layer 12, with first 14 and second 16 surfaces. The first layer 12 is a dough which is made from mixing flour, water and yeast to achieve a relatively elastic medium which may be rolled, sheeted or otherwise prepared for coating with the second layer 26. The first layer 12 has first and second surfaces 18 and 20, respectively and first and second end edges 22 and 24.

The intermediate 10 is provided with a second layer 26 which is coated on one of the first and second surfaces 14 and 16 and in a manner so as to be near one of the first and second end edges 18 and 20. As shown in FIG. 1, the second layer 26 is coated so that the coating is substantially coterminous with the second end edge 20 of the first layer 12.

As used herein the term "dough intermediate" refers to a dough product, which typically undergoes at least one additional step by an end user before the dough is ready to be consumed as a finished product. Such finished products include, rolls, biscuits, cinnamon buns or rolls, pastries and the like. In a preferred embodiment of the present invention, the dough intermediate is a cinnamon roll that is subsequently cooked either by a conventional or microwave oven.

The second layer 26 comprises a cinnamon mixture and was formed according to the following formula. The formula is intended to be illustrative only and not limiting in scope of the present invention.

| Ingredient | Weight Percentage |
|---|---|
| Sugar | 44.68 |
| Shortening | 14.70 |
| Water | 13.02 |
| Cinnamon | 8.27 |
| Corn Syrup | 7.50 |
| Molasses | 4.80 |
| Flour | 2.00 |
| Starch | 1.95 |

-continued

| Ingredient | Weight Percentage |
|---|---|
| Whey | 1.76 |
| Albumen | 0.73 |
| Salt | .59 |
| Total | 100 |

The dough mixture used in forming the dough intermediate 10 was prepared in accordance with the following. The formula is intended to be illustrative only and not limiting in scope of the present invention.

| Ingredient | Weight Percentage |
|---|---|
| Flour | 51.8 |
| Water | 23.98 |
| Sugar | 4.03 |
| Corn Syrup | 3.73 |
| Dextrose | 3.51 |
| Yeast | 2.09 |
| Glycerol | 1.86 |
| Shortening | 1.84 |
| Egg Solids | 1.77 |
| Whey | 1.49 |
| Soda | 0.80 |
| Salt | 0.75 |
| SAPP | 0.55 |
| Mono & DI Glycerides | 0.50 |
| Dough Conditioners | 0.50 |
| Flavor | 0.41 |
| SALP | 0.40 |
| Total | 100 |

As used herein SAPP refers to sodium aluminum pyrophosphates, which is a fast acting chemical leavening agent. SALP refers to sodium aluminum phosphate which is slow acting chemical agent. However, other chemical leavening agents may also be used such as DCP—dicalcium phosphate, MCP—monocalcium phosphate monohydrate, SAS—sodium aluminum sulfate, potassium hydrogen tartrate—cream of tartar, combinations and the like.

The flour is preferably a wheat-based flour, but other flour types such as barley, rice, corn, potato and soy flour may also be used in this invention.

Other dough formulations that are useable in the present invention include, for example fat or shortening in an amount from 1 to 20% by weight, egg solids in an amount of from about 0.01% to about 25%, milk replacer, milk solids or whey in an amount of from about 0.1% to about 12%, sugar in an amount from about 1% to about 25%, yeast in an amount of from about 1.0% to about 7% and water in an amount from about 40% to about 80%. The forgoing percentages are based on weight of the mixture.

The dough was prepared by adding the ingredients to a mixer, where it was mixed on low speed for approximately one minute, until a dough ball was formed and then on medium to high speed for approximately eight minutes.

The dough was then removed from the mixture and then sheeted or rolled out and cut into strips. The ends of the strips were moistened with water to form a sealing end for the product. The cinnamon layer, layer 26 as described above, is deposited onto the dough strips and spread evenly across the surface 16, such that the cinnamon layer is approximately adjacent to an end edge 20 of the first layer 12 of the dough intermediate 10. The dough was then rolled onto itself to form the desired number of rolls, layers or swirls and then the roll is cut into roughly one inch slices to form the dough intermediate 10 which is subjected to the partial thermal treatment as shown in the schematic of FIG. 2.

Figure 2:
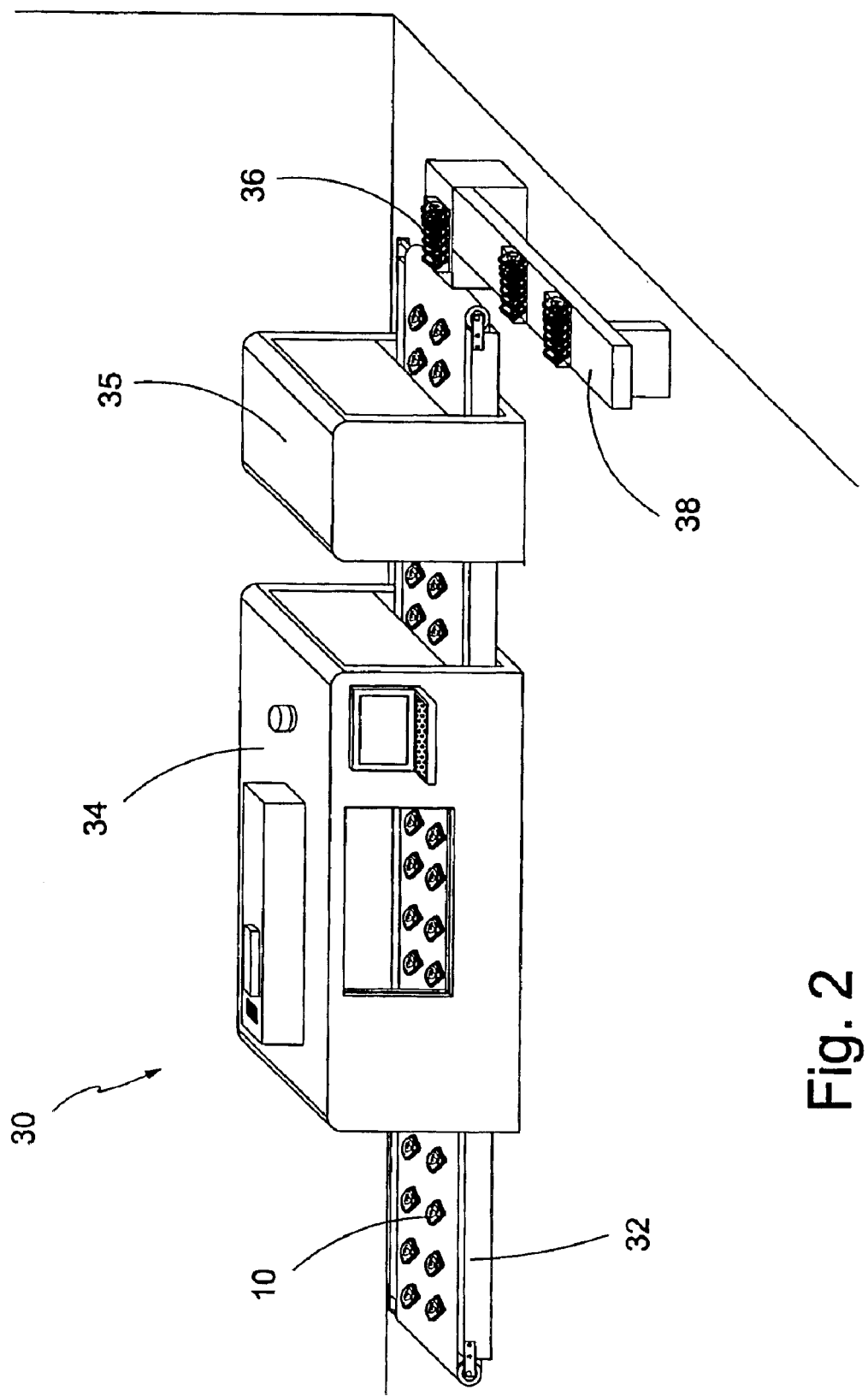
FIG. 2 is a schematic of the manufacturing line used in the preparation of the dough intermediate, according to the present invention.
Figure 3:
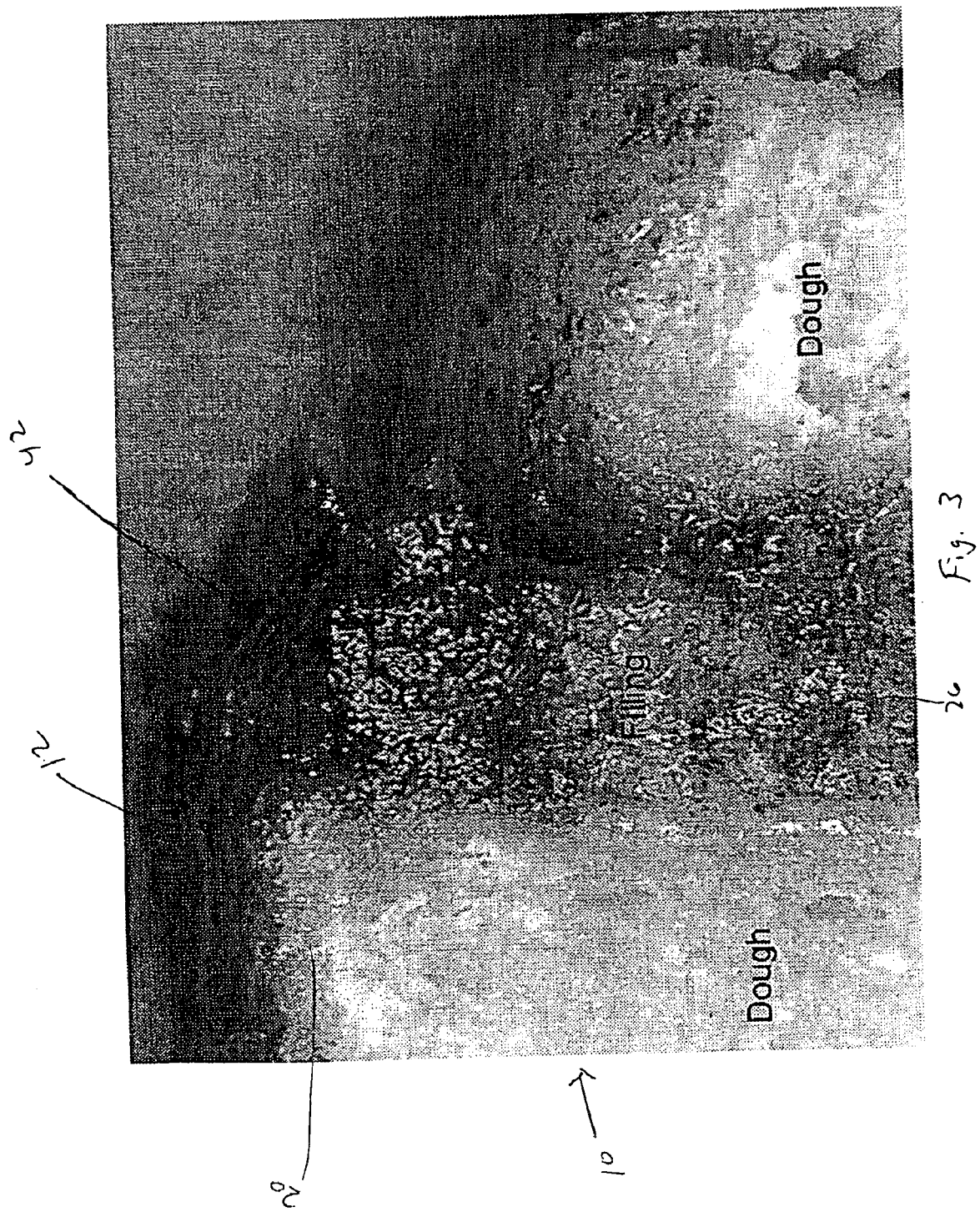
FIG. 3 is a photograph of the dough intermediate illustrating the formation of the temporary impermeable barrier on the first and second layers of the intermediate, according to the invention.

Turning to FIG. 2, a schematic of the manufacturing line is provided and illustrated generally at 30. The manufacturing line 30 includes a means for moving the dough intermediate 10 such as a conveyor belt 32. The dough intermediates 10 are advanced toward an oven 34, which applies heat to the bottom of the dough intermediates 10. The dough intermediate 10 is subjected to a temperature ranging from 250° to 500° F. and for approximately 1 to 30 seconds in duration. The application of such a thermal treatment through the oven 34 reduces the chances that the dough intermediate 10 will stick to the conveyor belt 32 after passing through the proofer 35 as the thermal treatment creates a temporary impermeable seal on the bottom of the dough intermediate 10 as illustrated in FIG. 3. The amount of thermal treatment is controlled so as to not prematurely brown or dry the dough intermediate 10 thereby avoiding the creation of a product, which would not be aesthetically appealing or palatable to the end user. Preferably, the thermal treatment ranges from about 250° to 500° F. for about 10 to 20 seconds, more preferably 300° F. to 400° F. and still more preferably 375° F. for 15 seconds.

FIG. 3 illustrates the dough intermediate 10 after having been subjected to the partial thermal treatment provided in oven 34. As can be seen from the photograph, a temporary impermeable barrier 40 has been created on an end edge 20 of the dough intermediate. Each of layers 12 and 26 has a different thermal property from the other which creates a different temporary impermeable barrier extending into the layer. With respect to layer 12 the temporary impermeable barrier 42 extends between 500 to 1000 microns into the layer 12 whereas with layer 26, the temporary impermeable layer extends about 500 to 1500 microns into the layer.

After the dough intermediates were subjected to the partial thermal treatment, slices of the dough were analyzed to determine the storage modulus, "G'" in Pascals (Pa) for the dough intermediates as compared to untreated dough intermediates. The analysis shows that the dough intermediates that were thermal treated were harder than those that were not treated.

| Strain % | G' Pa | G" Pa | tan_delta |
|---|---|---|---|
| Dough 1 with Thermal Treating | | | |
| 0.00495 | 22293.5 | 11905.1 | 0.53401 |
| 0.01052 | 22610.4 | 10161.7 | 0.44943 |
| 0.02279 | 23983.5 | 11038.7 | 0.46026 |
| 0.04902 | 26476.1 | 10976.8 | 0.41459 |
| 0.10623 | 26729.5 | 11798.3 | 0.4414 |
| 0.23125 | 25100.4 | 11951.8 | 0.47616 |
| 0.48859 | 20633.5 | 11614 | 0.5214 |
| 1.07494 | 18856 | 10856.4 | 0.57575 |
| 2.31576 | 14433.5 | 9301.46 | 0.64443 |
| 4.99377 | 10081.4 | 7359.75 | 0.73003 |
| Dough 2 without thermal treating | | | |
| 0.005 | 7959.15 | 2930.25 | 0.36816 |
| 0.01054 | 8827.93 | 4091.57 | 0.46348 |
| 0.02294 | 9609.8 | 4375.78 | 0.45535 |
| 0.04952 | 10198.5 | 4289.3 | 0.42058 |
| 0.10662 | 10176.5 | 4453.08 | 0.43758 |

-continued

| Strain % | G' Pa | G" Pa | tan_delta |
|---|---|---|---|
| 0.23174 | 9543.76 | 4459.22 | 0.46724 |
| 0.49938 | 8443.33 | 4295.08 | 0.50869 |
| 1.07663 | 7075.58 | 3951.92 | 0.55853 |
| 2.32099 | 5625.79 | 3437.56 | 0.61104 |
| 5.00322 | 4262.89 | 2822.92 | 0.66221 |

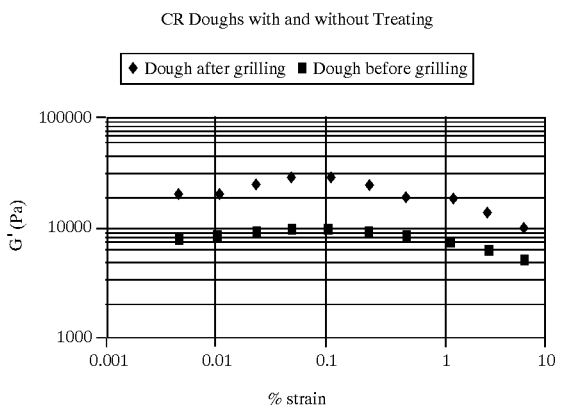

CR Doughs with and without Treating

The above analysis was conducted by using an ARES-LS Reometer from Rheometrics, Inc. of Piscataway, N.J. The device uses parallel plate fixtures, 25 mm in diameter rotating plates, using a 4.3 mm dough sample height. The device makes an oscillatory strain sweep test (0.0015% to 10% stain at 3 rad/sec. Frequency).

Figure 4:
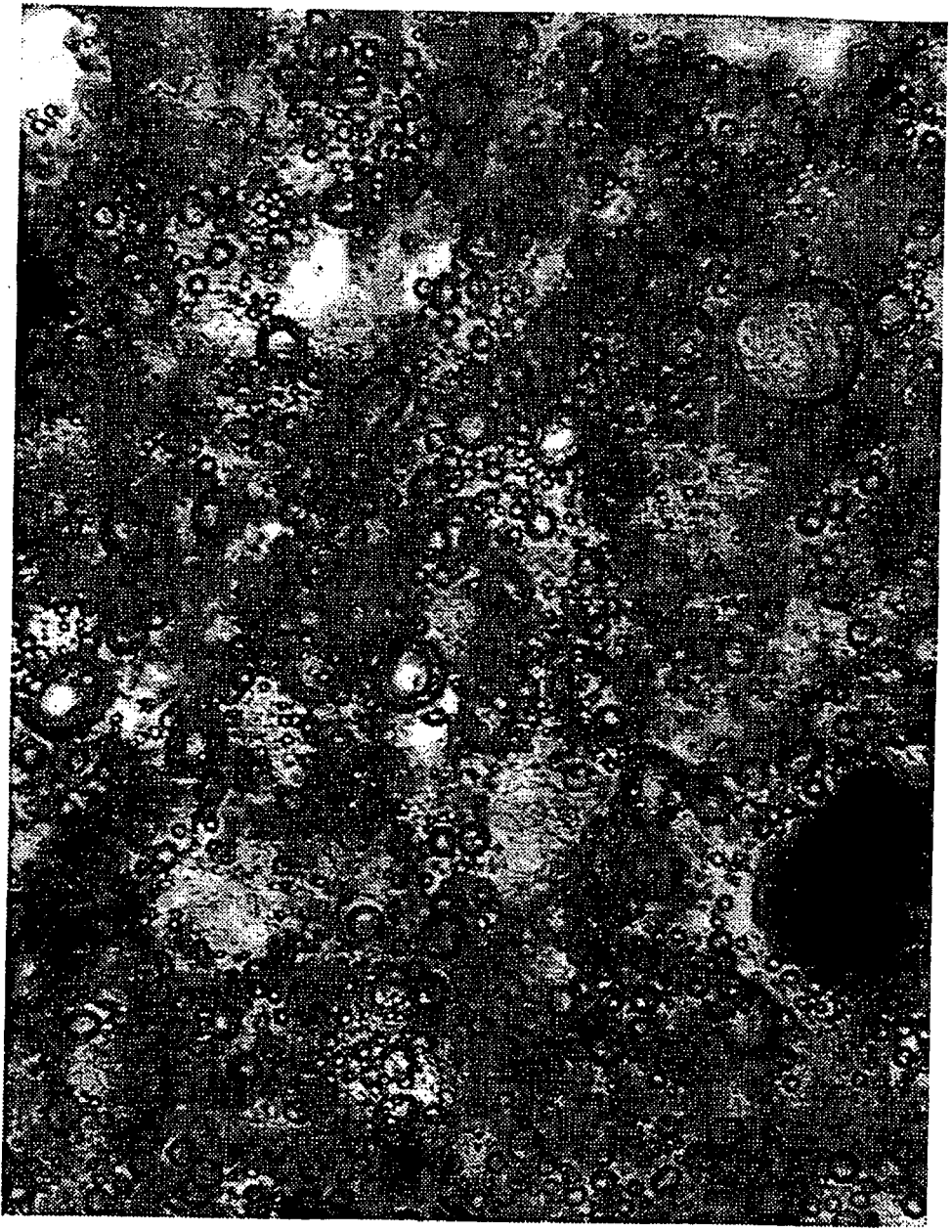
FIG. 4 is a photograph of the dough intermediate prior to the thermal treatment step illustrating the amount of air bubbles found in the product.
Figure 5:
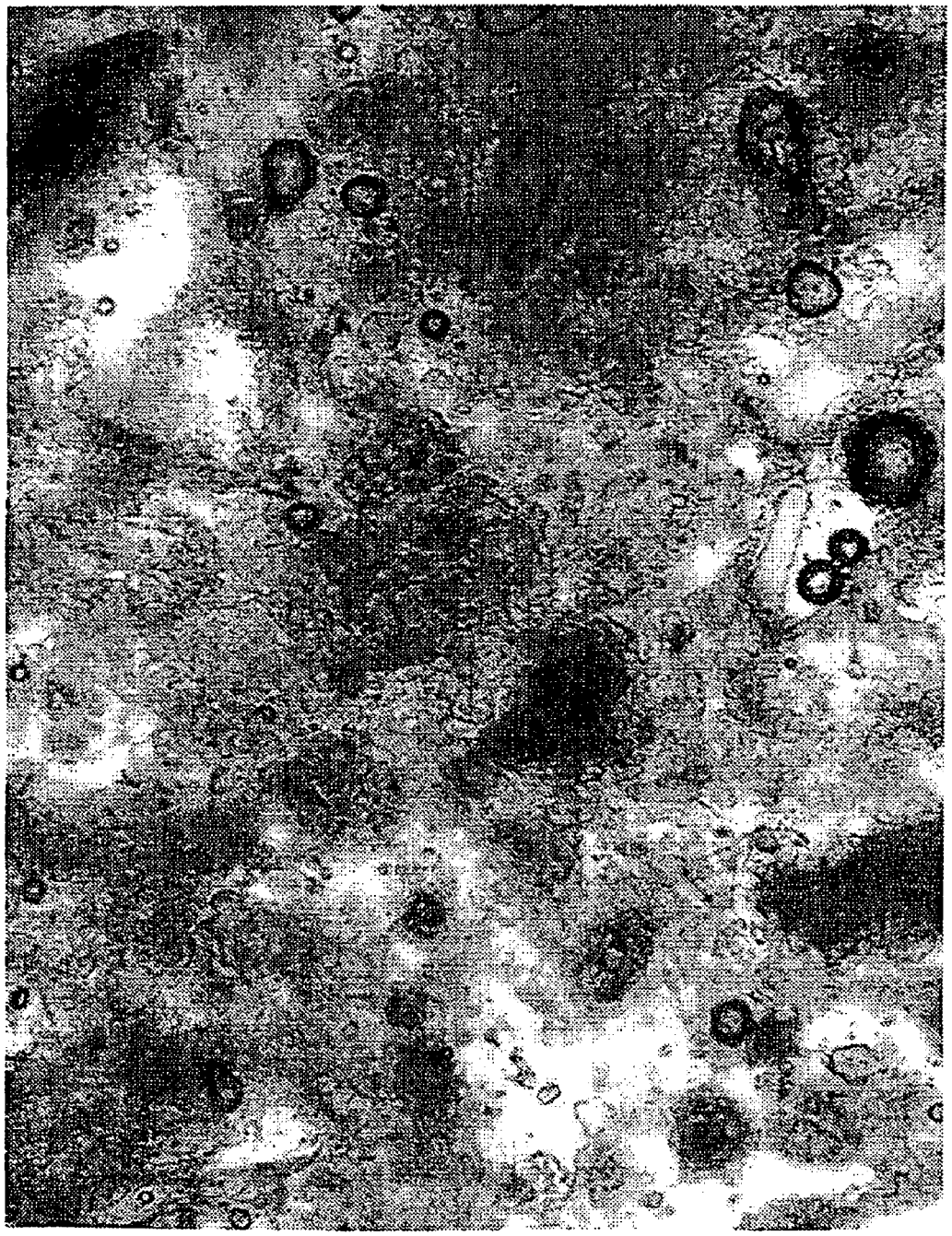
FIG. 5 is a photograph of the dough intermediate after the thermal treatment step illustrating the amount of air bubbles remaining in the product.

It has been found that during the thermal treatment step, the amount of air bubbles in the area of the thermal treatment, that is near the end edge 20 of the first layer 12, in the second layer 26 can be substantially reduced by as much as 40% and preferably by more than 60%. FIGS. 4 and 5 provide illustrations showing the relative reduction of the amount of bubbles both before and after the partial thermal treatment step. Reduction in the amount of air bubbling reduces the flowability of the layer 26 and reduces the tendency of the layer to contact the belt. In addition, reducing the amount of bubbling increases the amount or depth that the temporary impermeable layer extends into the layer 26.

It will thus be seen according to the present invention a highly advantageous dough product has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

What is claimed is:

1. A method of preparing a partially thermal treated dough intermediate comprising the steps of:

providing an intermediate having first and second layers, with only one of said first and second layers is formed from a dough, said first layer having first and second surfaces and first and second end edges;

advancing said intermediate in a first direction;

prior to a proofing step, applying a partial thermal treatment to one of said first and second end edges for a period of time between 1 and 30 seconds to transform at least a portion of said intermediate into a substantially non-sticky material.

2. A method of preparing a partially thermal treated dough intermediate as recited in claim 1, wherein the partial thermal treatment is done at temperatures between 250° and 500° F.

* * * * *